United States Patent
Kawamura et al.

(10) Patent No.: US 8,532,912 B2
(45) Date of Patent: Sep. 10, 2013

(54) ENGINE CONTROL SYSTEM

(75) Inventors: Jun Kawamura, Chita-gun (JP); Takahiro Ono, Kasugai (JP)

(73) Assignee: Denso Corporation, Kariya (JP)

( * ) Notice: Subject to any disclaimer, the term of this patent is extended or adjusted under 35 U.S.C. 154(b) by 638 days.

(21) Appl. No.: 12/709,683

(22) Filed: Feb. 22, 2010

(65) Prior Publication Data

US 2010/0217505 A1 Aug. 26, 2010

(30) Foreign Application Priority Data

Feb. 24, 2009 (JP) .................................. 2009-41081

(51) Int. Cl.
*F02D 43/00* (2006.01)
*F02D 41/14* (2006.01)
*G06F 19/00* (2011.01)

(52) U.S. Cl.
USPC ............ 701/109; 701/108; 701/115; 123/698

(58) Field of Classification Search
USPC ................. 701/102–105, 108, 109, 111, 115; 123/434–436, 467, 406.11, 406.45–406.48, 123/406.51, 568.11, 674, 679, 698
See application file for complete search history.

(56) References Cited

U.S. PATENT DOCUMENTS

| | | | |
|---|---|---|---|
| 5,473,887 A | 12/1995 | Takeshima et al. | |
| 2002/0038543 A1* | 4/2002 | Nishimura et al. | 60/284 |
| 2002/0053336 A1* | 5/2002 | Nogi et al. | 123/299 |
| 2003/0116150 A1 | 6/2003 | Kobayashi et al. | |
| 2004/0194737 A1* | 10/2004 | Miyashita | 123/48 C |
| 2006/0011180 A1 | 1/2006 | Sasaki et al. | |
| 2008/0046128 A1 | 2/2008 | Sasaki et al. | |
| 2008/0228383 A1* | 9/2008 | Nakagawa et al. | 701/113 |
| 2009/0143959 A1* | 6/2009 | Yamaoka et al. | 701/108 |
| 2009/0178405 A1* | 7/2009 | Chadwell | 60/600 |

FOREIGN PATENT DOCUMENTS

| | | |
|---|---|---|
| JP | 2004-346844 | 12/2004 |
| JP | P2004-346844 A | 12/2004 |
| JP | 2007-270695 | 10/2007 |

OTHER PUBLICATIONS

Japanese Office Action dated Sep. 27, 2011, issued in corresponding Japanese Application No. 2010-030223 with English Translation.
Japanese Office Action dated Jan. 10, 2012, issued in corresponding Japanese Application No. 2010-030223 with English Translation.

* cited by examiner

*Primary Examiner* — Willis R Wolfe, Jr.
*Assistant Examiner* — Johnny Hoang
(74) *Attorney, Agent, or Firm* — Nixon & Vanderhye P.C.

(57) ABSTRACT

An engine control system includes a unit which outputs a command for changing an air-fuel ratio of an exhaust gas, a unit which computes an in-cylinder oxygen concentration, a memory which stores a first value and a second value of parameters (ignition timing, injection pressure, pilot injection quantity). The first value is set in a case that the in-cylinder oxygen concentration is a first oxygen concentration. The second value is set in a case that the in-cylinder oxygen concentration is a second oxygen concentration which is higher than the first oxygen concentration. The values of the parameters are set in such a manner as to correlate to the in-cylinder oxygen concentration of during a transition period of the air-fuel ratio. The values of the parameters are obtained by an interpolation based on the first and the second value of the parameter and the in-cylinder oxygen concentration.

19 Claims, 9 Drawing Sheets

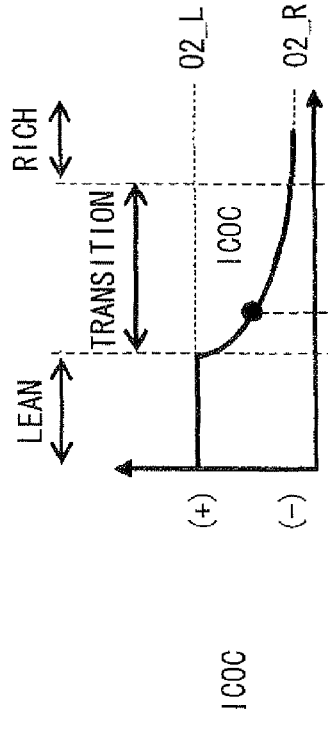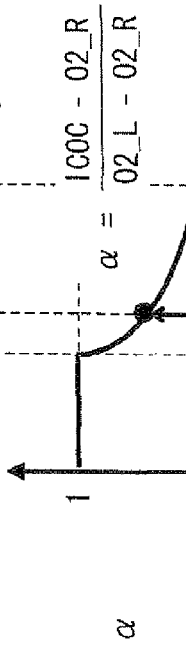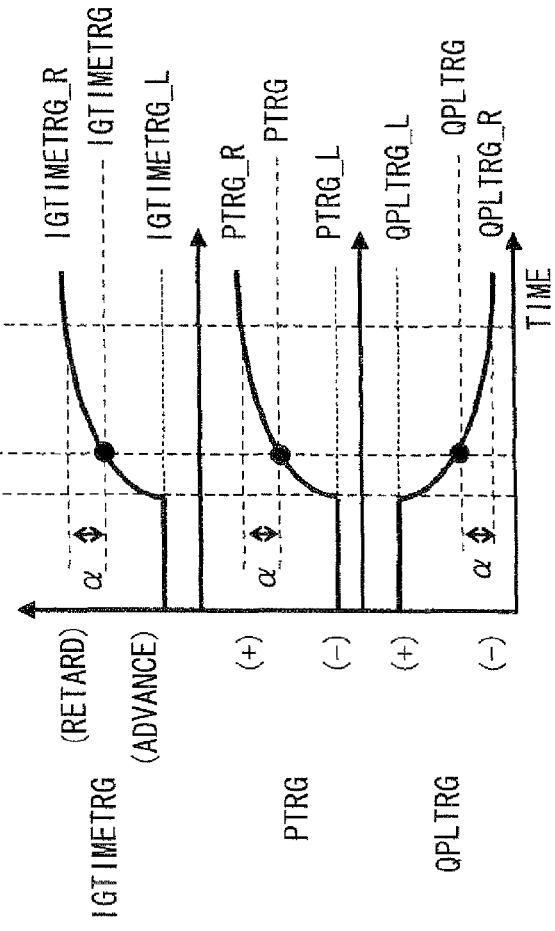
FIG. 8A
FIG. 8B
FIG. 8C

ENGINE CONTROL SYSTEM

CROSS-REFERENCE TO RELATED APPLICATION

This application is based on Japanese Patent Application No. 2009-41081 filed on Feb. 24, 2009, the disclosure of which is incorporated herein by reference.

FIELD OF THE INVENTION

The present invention relates to a control system for an internal combustion engine.

BACKGROUND OF THE INVENTION

As shown in Japanese patent No. 2600492, which is a counterpart of U.S. Pat. No. 5,473,887, it is well known that an exhaust purification device absorbs nitrogen oxide (NOx) when air-fuel ratio of exhaust gas is lean, and reduces the NOx when the air-fuel ratio is rich.

As a method of making the air-fuel ratio rich, a rich-combustion is known, in which a rich-gas is produced in an engine cylinder. When the rich-combustion is performed, an ignition timing, an injection pressure, a pilot injection quantity and the like are controlled differently from those in a lean-combustion in order to reduce emissions.

In order that a driver and/or passengers do not have uncomfortable feeling in between the lean-combustion and the rich-combustion, combustion noises are adjusted to be heard sensorily equal therebetween.

But, during a transition period from the lean-combustion to the rich-combustion, since the oxygen concentration ($O_2$ concentration) in a cylinder and the other combustion condition are gradually varied, it is difficult to keep the combustion noise constant, which may make the passengers uncomfortable.

SUMMARY OF THE INVENTION

The present invention is made in view of the above matters, and it is an object of the present invention to provide an engine control system which enables to reduce uncomfortable feelings of passengers caused by the combustion noise even during the transition period of the air-fuel ratio.

According to the present invention, an engine control system includes a concentration computing means which computes an in-cylinder oxygen concentration. Further, the engine control system includes a memory means which stores a first value and a second value of at least one parameter of a target ignition timing, a target injection pressure, and a target pilot injection quantity. The first value is set in a case that the in-cylinder oxygen concentration is a first oxygen concentration. The second value is set in a case that the in-cylinder oxygen concentration is a second oxygen concentration which is higher than the first oxygen concentration.

The system further includes a parameter value setting means which sets a value of the parameter in such a manner as to correlate to the in-cylinder oxygen concentration of during a transition period of the air-fuel ratio. The value of the parameter is obtained by an interpolation based on the first and the second value of the parameter and the in-cylinder oxygen concentration.

That is, the parameter value can be set according to the in-cylinder oxygen concentration at the time. Even during a transition period of the air-fuel ratio, the parameter can be appropriately set according to the in-cylinder oxygen concentration at the time. As the result, the combustion noise during the transition period of the air-fuel ratio can be suitably controlled so that the passenger does not feel uncomfortable.

BRIEF DESCRIPTION OF THE DRAWINGS

Other objects, features and advantages of the present invention will become more apparent from the following description made with reference to the accompanying drawings, in which like parts are designated by like reference numbers and in which:

FIG. 8A is a graph showing a variation in a in-cylinder oxygen concentration during a transition period from a lean-combustion to a rich-combustion;

FIG. 8B is a graph showing a variation in an in-cylinder oxygen ratio;

FIG. 8C is a graph showing variations in a target ignition timing, a target injection pressure, and a target pilot injection quantity during the transition period from a lean-combustion to a rich-combustion;

DETAILED DESCRIPTION OF EMBODIMENTS

An embodiment of the present invention will be described hereinafter.

1. Configuration of Diesel Engine Control System

Figure 1:
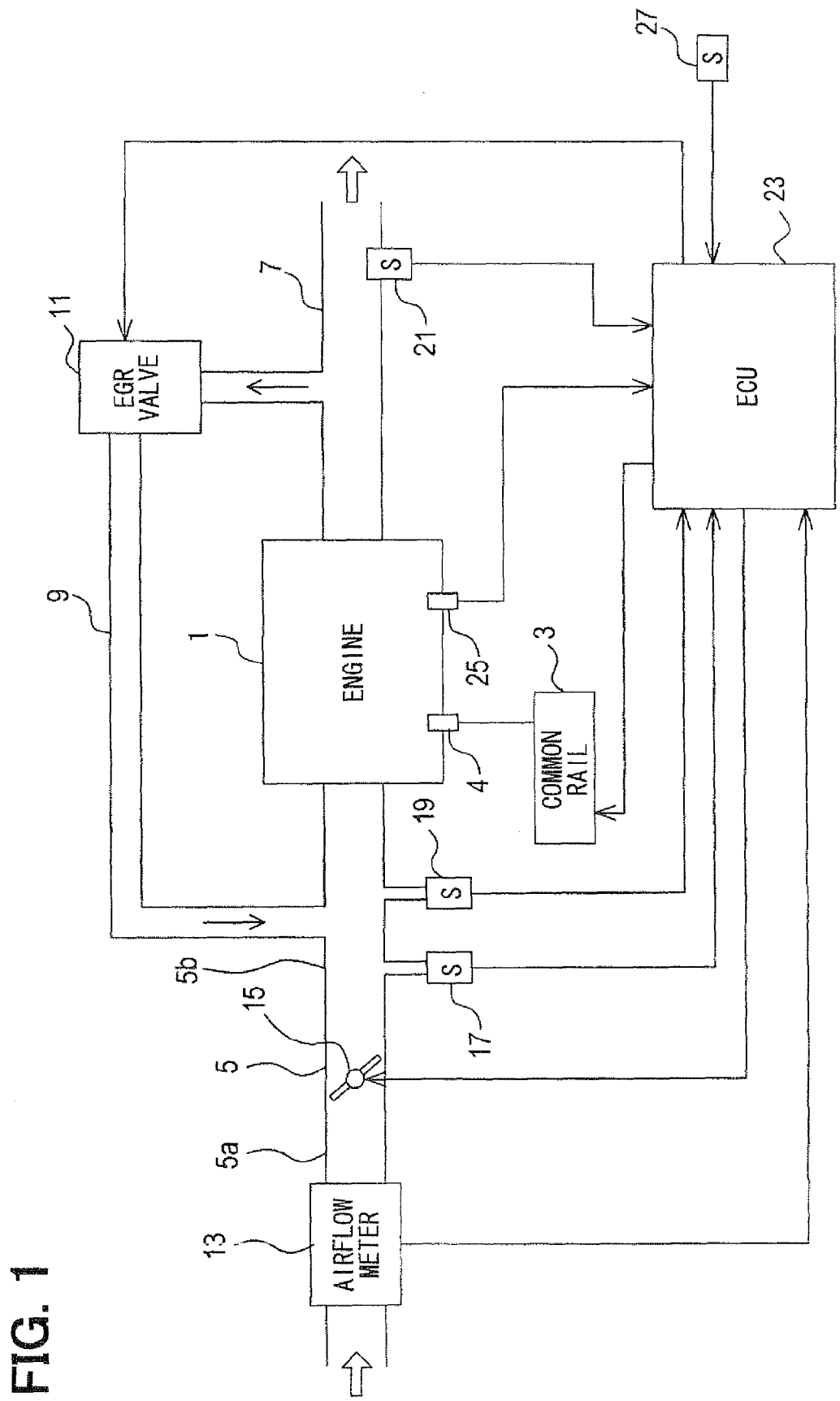
FIG. 1 is a block diagram showing a configuration of an engine control system.

FIG. 1 is a schematic view showing a configuration of a diesel engine control system.

A diesel engine 1 is provided with a common rail 3 which accumulates high-pressure fuel therein. The high-pressure fuel is injected into a combustion chamber by a fuel injector 4 mounted on a cylinder head of the engine 1. Also, the engine 1 is provided with an exhaust gas recirculation (EGR) system. The EGR system is comprised of an EGR passage 9 fluidly connecting an intake passage 5 and an exhaust passage 7, and an EGR valve 11 controlling an exhaust gas quantity recirculating through the EGR passage 9.

An airflow meter 13 is provided in the intake passage 5 upstream of a connecting point between the EGR passage 9 and the intake passage 5. A throttle valve 15 is provided in the intake passage 5 downstream of the airflow meter 13. Further, an intake pressure sensor 17 detecting intake air pressure and an intake temperature sensor 19 detecting intake air temperature are provided in the intake passage 5 downstream of the throttle valve 15. It should be noted that a part of the intake passage 5 upstream of the throttle valve 15 is referred to as an intake pipe 5a and a part of the intake passage downstream of the throttle valve 15 is referred to as an intake manifold 5b in the present embodiment. An oxygen sensor (O2 sensor) 21 detecting an oxygen concentration ($O_2$ concentration) of the exhaust gas is provided in the exhaust passage 7 downstream of a connecting point between the EGR passage 9 and the exhaust passage 7.

The detection signals detected by the airflow meter 13, the intake pressure sensor 17, the intake temperature sensor 19 and the O2 sensor 21 are inputted into an electronic control unit (ECU) 23, which includes a microcomputer, a ROM, and the like. Further, the present control system is provided with a rotation angle sensor 25 for detecting an engine speed, and an accelerator sensor 27 for detecting an accelerator position. The detection signals of these sensors are also inputted into the ECU 23.

The ECU 23 controls an opening degree of the throttle valve 15, an opening degree of the EGR valve 11, a fuel injection quantity and a fuel injection pressure of the injector 4. It should be noted that the fuel injection by the fuel injector 4 is comprised of a pilot injection and a main injection, of which the injection quantity and the injection pressure are controlled by the ECU 23.

Further, the ECU 23 outputs a first command in which the air-fuel ratio of the exhaust gas is changed from a ratio in the lean-combustion to a ratio in the rich-combustion, and a second command in which the air-fuel ratio of the exhaust gas is changed from a ratio in the rich-combustion to a ratio in the lean-combustion. When the first command is outputted, the opening degree of the throttle valve 15 is made smaller than that in the lean-combustion and the fuel injection quantity is made greater than that in the lean-combustion. When the second command is outputted, the opening degree of the throttle valve 15 is made greater than that in the rich-combustion and the fuel injection quantity is made smaller than that in the rich-combustion.

Further, the ECU 23 stores a target ignition timing, a target injection pressure, and a target pilot injection quantity in the ROM (not shown). Specifically, the ECU 23 stores a first target ignition timing "IGTIMETRG_R", a first target injection pressure "PTRG_R", and a first target pilot injection quantity "QPLTRG_R" which correspond to a case that the oxygen concentration in the cylinder is a first oxygen concentration "O2_R". Also, the ECU 23 stores a second target ignition timing "IGTIMETRG_L", a second target injection pressure "PTRG_L", and a second target pilot injection quantity "QPLTRG_L" which correspond to a case that the oxygen concentration in the cylinder is a second oxygen concentration "O2_L".

It should be noted that the first oxygen concentration "O2_R" corresponds to an oxygen concentration in a cylinder at a time when a specified enough time period has elapsed after the lean-combustion was changed to the rich-combustion. The second oxygen concentration "O2_L" corresponds to an oxygen concentration in a cylinder at a time when a specified enough time period has elapsed after the rich-combustion was changed to the lean-combustion. The second oxygen concentration "O2_L" is higher than the first oxygen concentration "O2_R".

The first and the second target ignition timing "IGTIMETRG_R", "IGTIMETRG_L", the first and the second target injection pressure "PTRG_R", "PTRG_L", the first and the second target pilot injection quantity "QPLTRG_R", "QPLTRG_L" are set so that the combustion noises are heard sensorily equal in between the lean-combustion and the rich-combustion. A relationship between the combustion noises and the target ignition timing, the target injection pressure and the target pilot injection quantity is well known. This relationship is easily confirmed by experiments. Thus, the first and the second ignition timing "IGTIMETRG_R", "IGTIMETRG_L", the first and the second target injection pressure "PTRG_R", "PTRG_L", the first and the second target pilot injection quantity "QPLTRG_R", "QPLTRG_L" can be set as described above.

The ECU 23 stores a two-dimensional map including a time constant "T" which will be described later.

Figure 2:
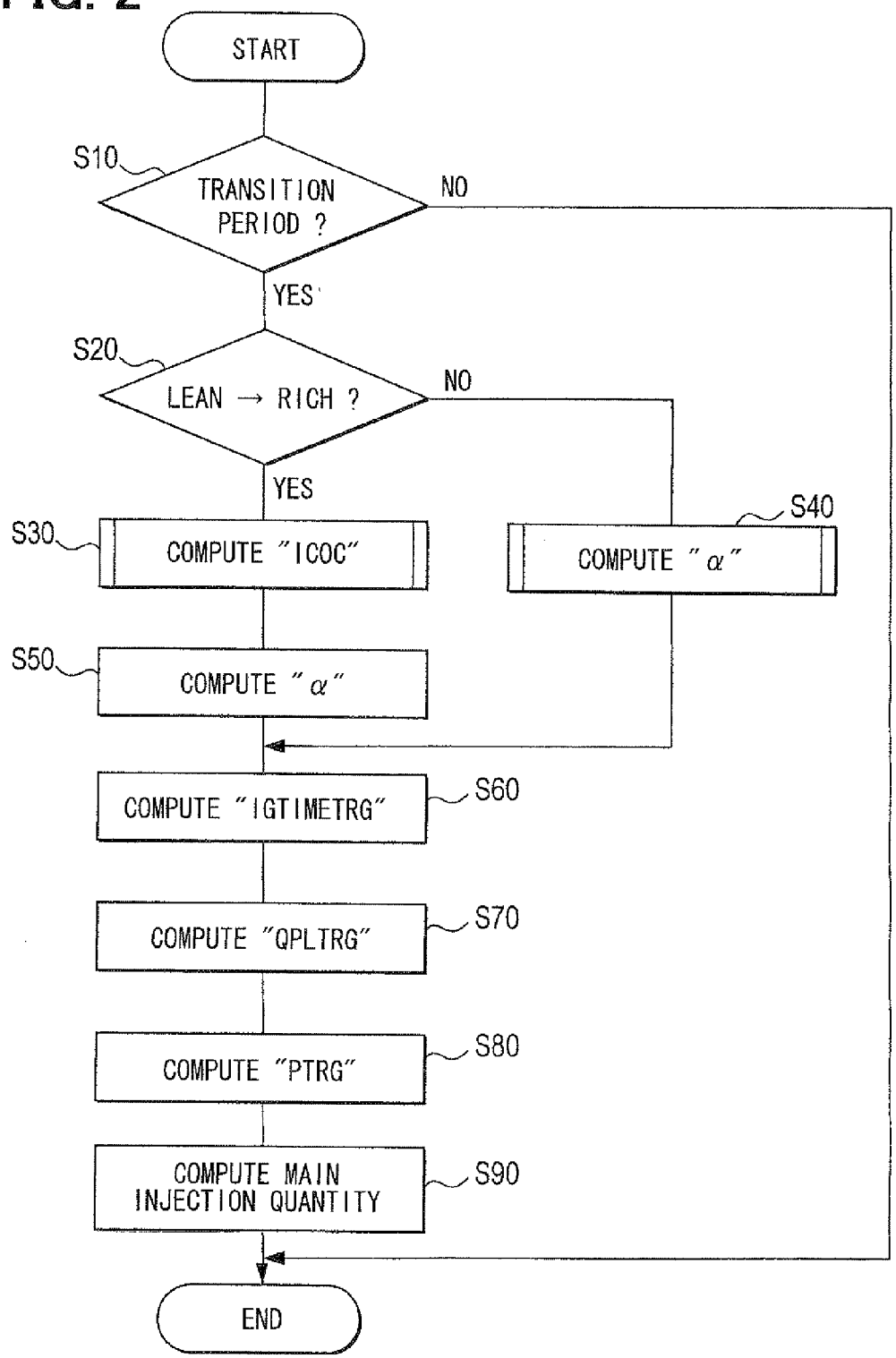
FIG. 2 is a flowchart showing a processing which the engine control system executes.

2. Processing that Control System Executes (1) Referring to a flowchart shown in FIG. 2, a processing that the engine control system executes will be described. The processing shown in FIG. 2 is repeatedly executed at regular intervals.

In step S10, the computer determines whether it is in the transition period of the air-fuel ratio where the lean-combustion is changed to the rich-combustion or the rich-combustion is changed to the lean-combustion. The transition period corresponds to a time period until a specified period has elapsed after the first or the second command was outputted. When the answer is Yes in step S10, the procedure proceeds to step S20. When the answer is No, the processing ends.

In step S20, the computer determines whether it is the transition period from the lean combustion to the rich combustion. When the answer is Yes, the procedure proceeds to step S30. When the answer is No, that is, when it is the transition period from the rich-combustion to the lean-combustion, the procedure proceeds to step S40.

In step S30, an in-cylinder oxygen concentration, which is referred to as "ICOC", is computed based on an intake air flow rate, an EGR gas flow rate, and an oxygen concentration in the EGR gas. The intake air flow rate corresponds to a fresh air flow rate flowing through the manifold 5b. The EGR gas flow rate corresponds to an EGR gas flow rate flowing into the manifold 5b from the EGR passage 9. The computing method of the "ICOC" will be described later.

FIG. 8A is a graph showing a variation in the "ICOC" during the transition period from the lean-combustion to the rich-combustion. The "ICOC" is equal to the second oxygen concentration "O2_L" before the transition period is started. During the transition period, the "ICOC" is gradually decreased. After the specified enough time has elapsed, the "ICOC" becomes equal to the first oxygen concentration "O2_R".

In step S40, an in-cylinder oxygen ratio "α" is computed based on the engine speed, the accelerator position, and an elapsed time after the command is outputted to vary the air-fuel ratio. The in-cylinder oxygen ratio "α" is defined based on the following formula (1).

$$\alpha = \frac{ICOC - O2\_R}{O2\_L - O2\_R} \quad (1)$$

The computing method of the in-cylinder oxygen ratio "α" in step S40 will be described later.

Figure 9A:
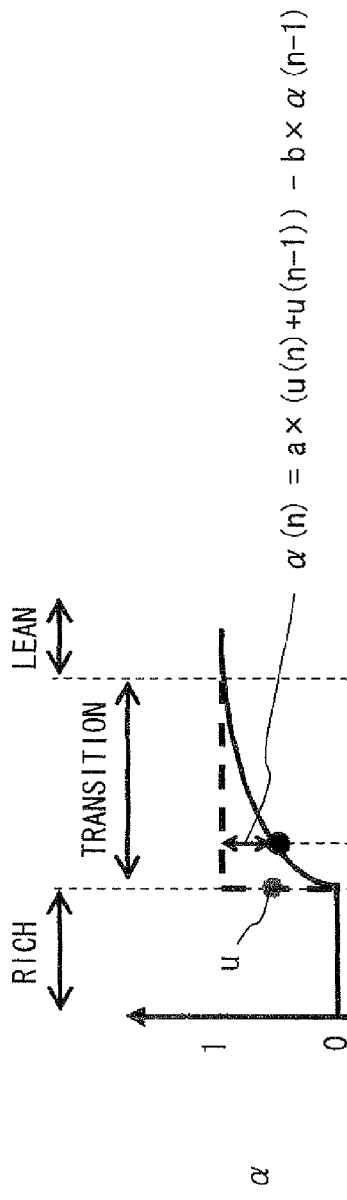
FIG. 9A is a graph showing a variation in the in-cylinder oxygen ratio during a transition period from a rich combustion to a lean combustion.

FIG. 9A is a graph showing a variation in the in-cylinder oxygen ratio "α" during the transition period from the rich-combustion to the lean-combustion. The in-cylinder oxygen ratio "α", which is indicated by a solid line in FIG. 9A, is zero before the transition period is started. During the transition period, the in-cylinder oxygen ratio "α" is gradually increased. After the specified enough time has elapsed, the in-cylinder oxygen ratio "α" becomes "1".

In step S50, the "ICOC" computed in step S30 is substituted into the above formula (1) to obtain the in-cylinder oxygen ratio "α".

FIG. 8B is a graph showing a variation in the in-cylinder oxygen ratio "α" during the transition period from the lean-combustion to the rich-combustion. The in-cylinder oxygen ratio "α" is "1" before the transition period is started. During the transition period, the in-cylinder oxygen ratio "α" is gradually decreased. After the specified enough time has elapsed, the in-cylinder oxygen ratio "α" becomes zero.

In step S60, the in-cylinder oxygen ratio "α" computed in step S40 or S50 and the first and the second target ignition timing "IGTIMETRG_R", "IGTIMETRG_L" previously stored in the ECU 23 are substituted into the following formula (2) to obtain a target ignition timing "IGTIMETRG" for the transition period.

$$IGTIMETRG = \alpha \times IGTIMETRG\_L + (1-\alpha) \times IGTIMETRG\_R \quad (2)$$

That is, the target ignition timing "IGTIMETRG" is computed by interpolation based on the in-cylinder oxygen ratio "α", the first and the second target ignition timing "IGTIMETRG_R", "IGTIMETRG_L".

FIG. 8C shows a relationship between the target ignition timing "IGTIMETRG", the first and the second target ignition timing "IGTIMETRG_R", "IGTIMETRG_L", and the in-cylinder oxygen ratio "α" during the transition period from the lean-combustion to the rich-combustion.

Figure 9B:
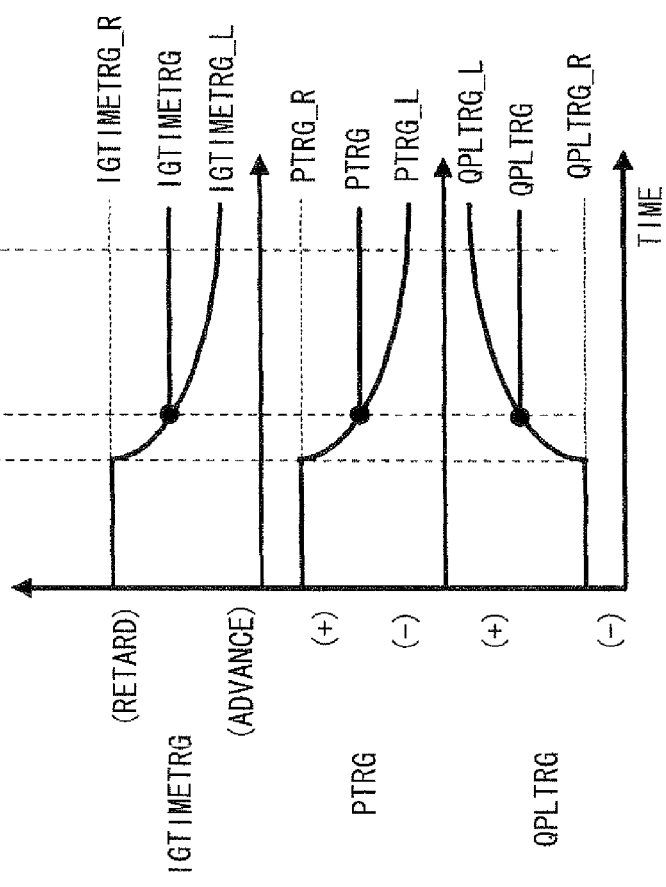
FIG. 9B is a graph showing variations in the target ignition timing, the target injection pressure, and the target pilot injection quantity during the transition period from a rich-combustion to a lean-combustion.

FIG. 9B shows a relationship between the target ignition timing "IGTIMETRG", the first and the second target ignition timing "IGTIMETRG_R", "IGTIMETRG_L", and the in-cylinder oxygen ratio "α" during the transition period from the rich-combustion to the lean-combustion.

In step S70, the in-cylinder oxygen ratio "α" computed in step S40 or S50 and the target pilot injection quantity "QPLTRG_R", "QPLTRG_L" previously stored in the ECU 23 are substituted into the following formula (3) to obtain a target pilot ignition quantity "QPLTRG" for the transition period.

$$QPLTRG = \alpha \times QPLTRG\_L + (1-\alpha) \times QPLTRG\_R \quad (3)$$

That is, the target pilot injection quantity "QPLTRG" is computed by interpolation based on the in-cylinder oxygen ratio "α", the first and the second target pilot injection quantity "QPLTRG_R", "QPLTRG_L".

FIG. 8C shows a relationship between the target pilot injection quantity "QPLTRG", the first and the second target pilot injection quantity "QPLTRG_R", "QPLTRG_L", and the in-cylinder oxygen ratio "α" during the transition period from the lean-combustion to the rich-combustion.

FIG. 9B shows a relationship between the target pilot injection quantity "QPLTRG", the first and the second target pilot injection quantity "QPLTRG_R", "QPLTRG_L", and the in-cylinder oxygen ratio "α" during the transition period from the rich-combustion to the lean-combustion.

In step S80, the in-cylinder oxygen ratio "α" computed in step S40 or S50 and the target injection pressure "PTRG_R", "PTRG_L" previously stored in the ECU 23 are substituted into the following formula (4) to obtain a target ignition pressure "PTRG" in the transition period.

$$PTRG = \alpha \times PTRG\_L + (1-\alpha) \times PTRG\_R \quad (4)$$

That is, the target injection pressure "PTRG" is computed by interpolation based on the in-cylinder oxygen ratio "α", the first and the second target injection pressure "PTRG_R", "PTRG_L".

FIG. 8C shows a relationship between the target injection pressure "PTRG", the first and the second target injection pressure "PTRG_R", "PTRG_L", and the in-cylinder oxygen ratio "α" of during the transition period from the lean-combustion to the rich-combustion.

FIG. 9B shows a relationship between the target injection pressure "PTRG", the first and the second target injection pressure "PTRG_R", "PTRG_L", and the in-cylinder oxygen ratio "α" during the transition period from the rich-combustion to the lean-combustion.

In step S90, a main injection quantity is computed by well-known computing method, such as a computing method based on an air excess ratio.

(2) Referring to FIGS. 3-7, a computing method of the "ICOC" in step S30 will be described hereinafter.

Figure 3:
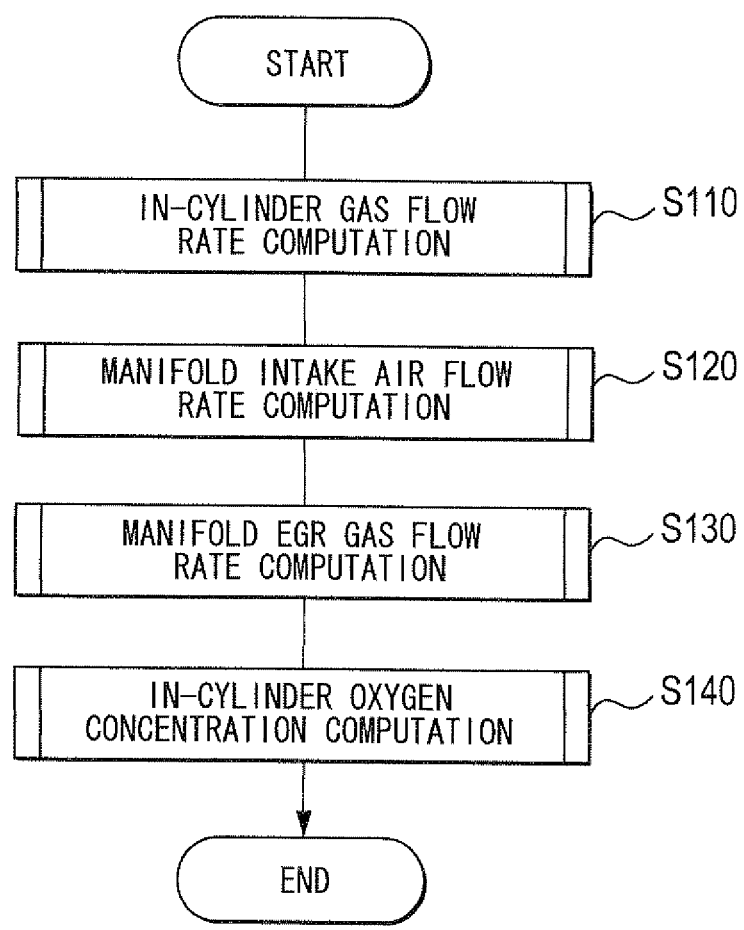
FIG. 3 is a flowchart showing a processing of in-cylinder oxygen concentration computation.

As shown in FIG. 3, the computing processing of the "ICOC" is comprised of an in-cylinder gas flow rate computation (S110), a manifold intake air flow rate computation (S120), a manifold EGR gas flow rate computation (S130), and a in-cylinder oxygen concentration computation (S140) in this series.

Figure 4:
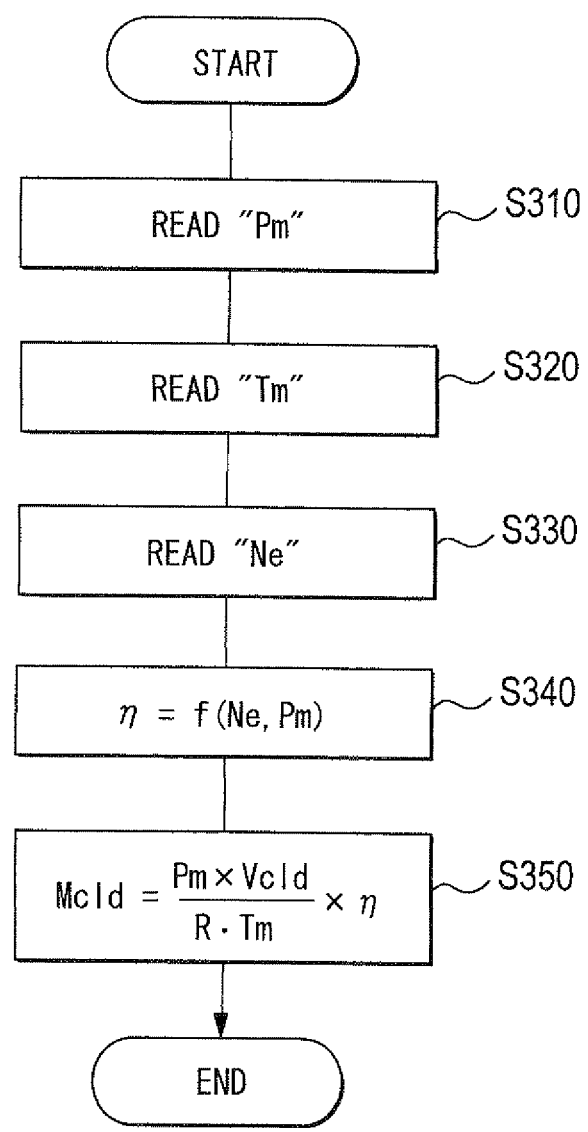
FIG. 4 is a flowchart showing a processing of in-cylinder gas flow rate computation.

Referring to FIG. 4, the in-cylinder gas flow rate computation will be described hereinafter.

A total quantity of gas (intake air, injected fuel, EGR gas) flowing into a cylinder of the engine 1 is referred to as an in-cylinder gas flow rate "McId". In steps S310-S330, the computer reads the intake pressure "Pm" detected by the intake pressure sensor 17, the intake temperature "Tm" detected by the intake temperature sensor 19, the engine speed "Ne" detected by the rotation angle sensor 25.

In step S340, a volumetric efficiency "η" is computed as a function of the engine speed "Ne" and the intake pressure "Pm".

In step S350, the in-cylinder gas flow rate "McId" is computed according to the equation of state and the volumetric efficiency "η". In the equation of state, "R" represents gas constant.

Figure 5:
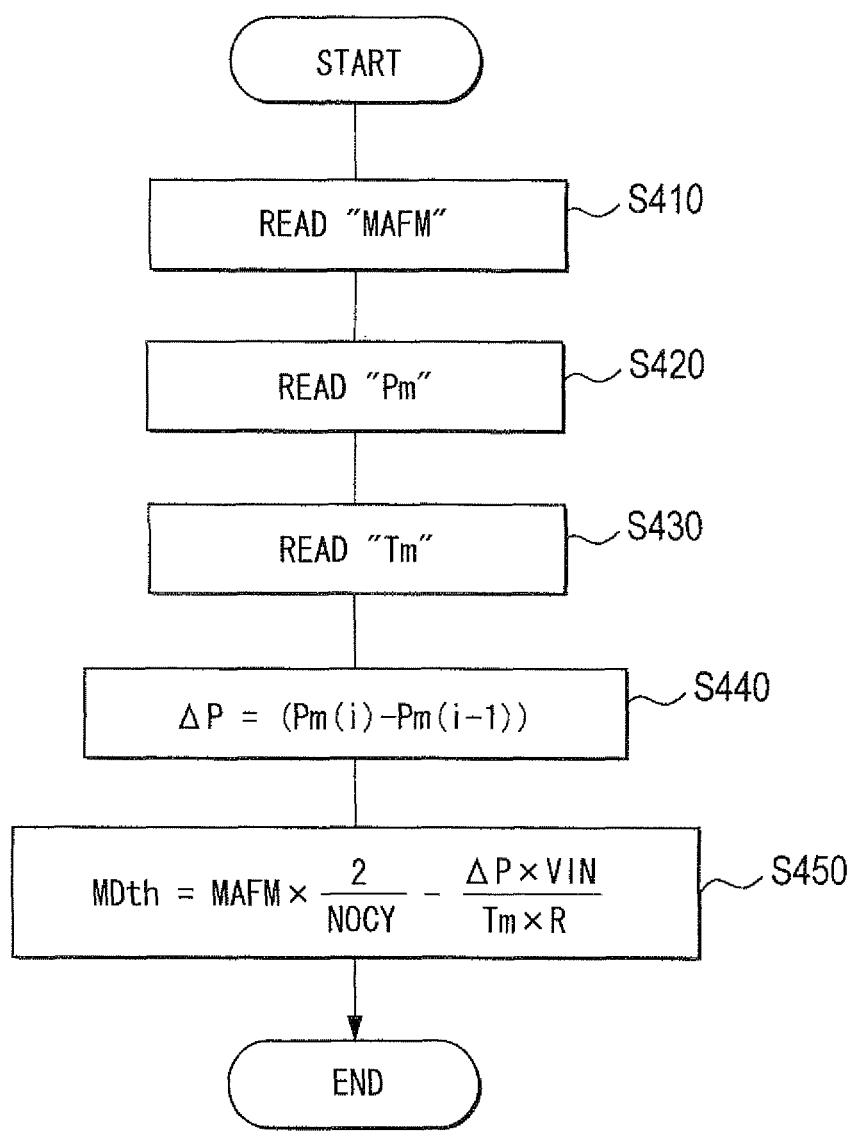
FIG. 5 is a flowchart showing a processing of manifold intake air flow rate computation.

Then, referring to FIG. 5, the manifold intake air flow rate computation will be described hereinafter.

The intake air flow rate flowing into the manifold 5b is referred to as the manifold intake air flow rate "MDth". In steps S410-S430, the computer reads air flow rate "MAFM" detected by the airflow meter 13, the intake pressure "Pm", and the intake temperature "Tm" in this series.

In step S440, a variation ΔP in the intake pressure is computed.

In step S450, the manifold intake air flow rate "MDth" is computed. The intake pressure "Pm" is used as the pressure in the intake pipe 5a from the airflow meter 13 to the throttle valve 15. The mass increase in the intake pipe 5a is computed according to the equation of state. The manifold intake air flow rate "MDth" is computed according to the mass conservation law represented by the following formula (5).

$$MAFM \times (2/NOCY) - MDth = \Delta P \cdot VIN/(Tm \cdot R) \quad (5)$$

"NOCY": Number of cylinders
"VIN": Volume of the intake pipe 5a

Figure 6:
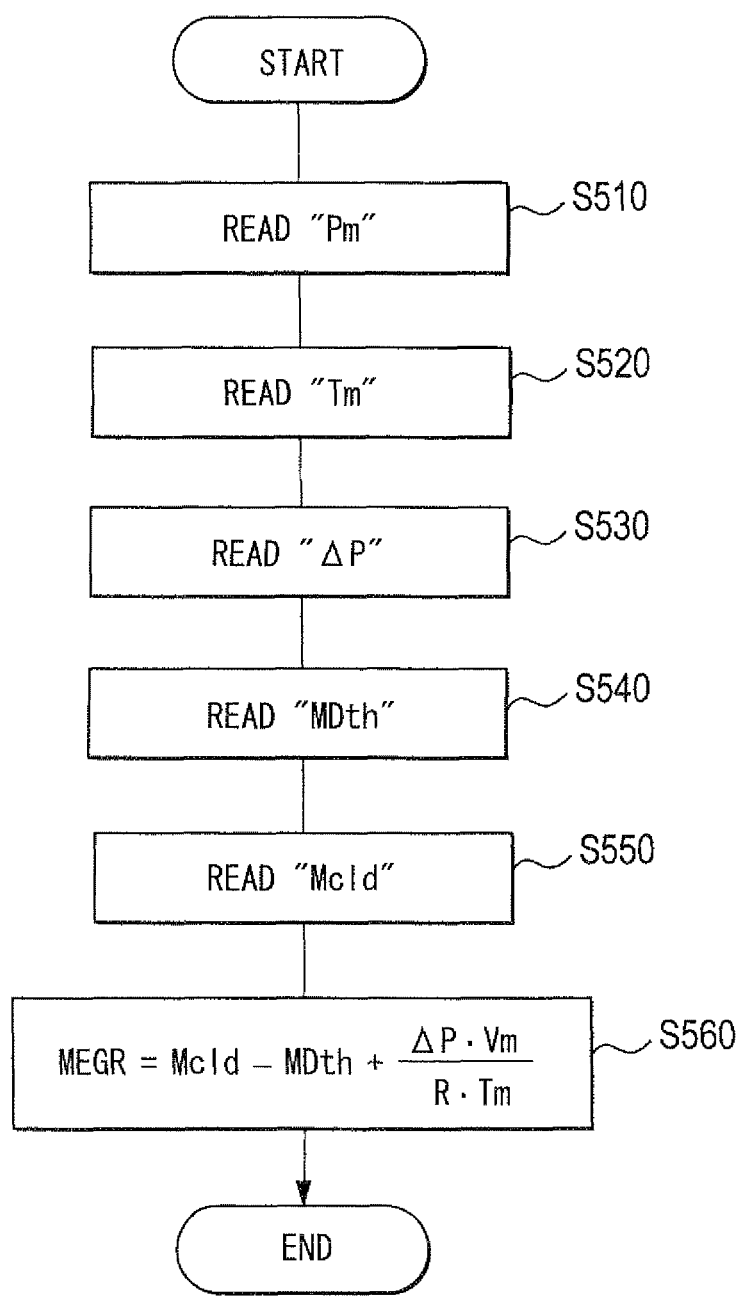
FIG. 6 is a flowchart showing a processing of manifold EGR gas flow rate computation.

Referring to FIG. 6, the manifold EGR gas flow rate computation will be described hereinafter.

The EGR gas flow rate flowing into the manifold 5b is referred to as the manifold EGR gas flow rate "MEGR". In steps S510-S550, the computer reads the intake pressure "Pm", the intake temperature "Tm", the variation ΔP in the intake pressure, the manifold intake air flow rate "MDth" and the in-cylinder gas flow rate "McId" in this series.

In step S560, the manifold EGR gas flow rate "MEGR" is computed. That is, the mass increase in the manifold 5b is computed according to the equation of state. The manifold EGR gas flow rate "MEGR" is computed according to the mass conservation law represented by the following formula (6).

$$MDth + MEGR - McId = \Delta P \cdot Vm/(Tm \cdot R) \quad (6)$$

"Vm": Volume of the manifold 5b

Figure 7:
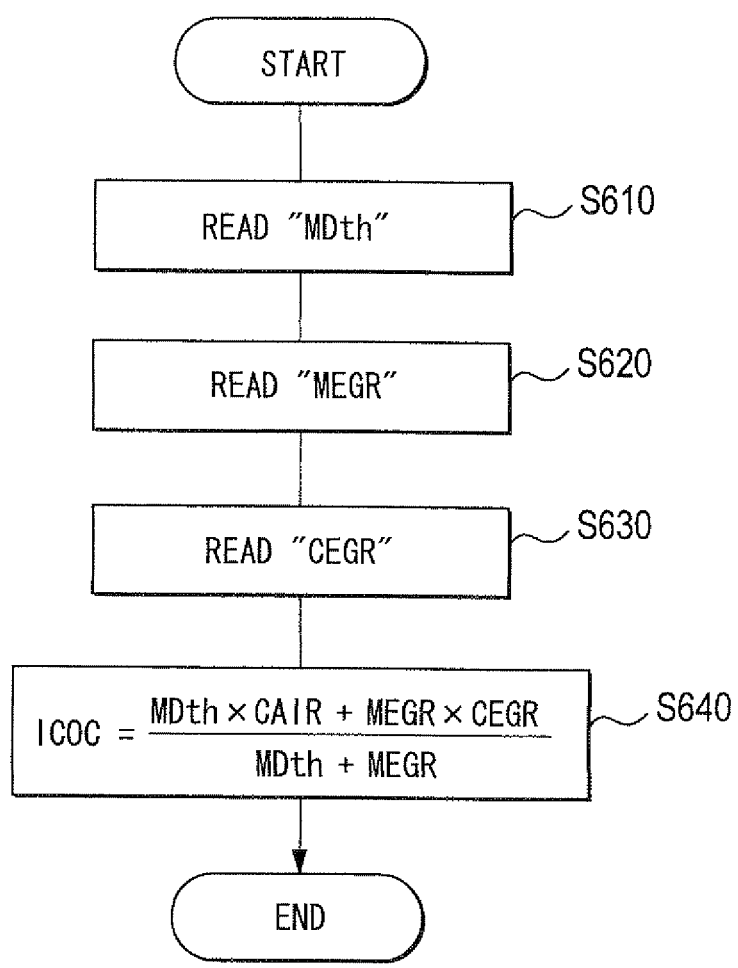
FIG. 7 is a flowchart showing a processing of in-cylinder oxygen concentration computation in detail.

Referring to FIG. 7, the in-cylinder oxygen concentration computation will be described hereinafter.

In steps S610-S630, the computer reads the manifold intake air flow rate "MDth", the manifold EGR gas flow rate "MEGR", and an oxygen concentration "CEGR" of the EGR gas detected by the O2 sensor 21.

In step S640, the "ICOC" is computed according to the following formula (7)

$$ICOC = \frac{MDth \times CAIR + MEGR \times CEGR}{MDth + MEGR} \quad (7)$$

"CAIR": Oxygen concentration in atmosphere (23.2% by weight)

(3) A computing method of the in-cylinder oxygen ratio "α" in step S40 will be described hereinafter.

In step S40, the variations in the "ICOC" and the in-cylinder oxygen ratio "α" are estimated according to a first-order-lag formula. The time constant "T", which depends on the engine speed and the accelerator position, is read out from the two-dimensional map stored in the ECU 23. The first-order-lag is computed according to the following formula (8).

$$\alpha(n) = a \cdot (u(n) + u(n-1)) - b \cdot \alpha(n-1) \quad (8)$$

$$a = \frac{1}{1 + 2\frac{T}{Ts}}, \quad b = \frac{1 - 2\frac{T}{Ts}}{1 + 2\frac{T}{Ts}}$$

It should be noted that "u" is a signal which stepwise changes from "0" to "1" or from "0" to "1" according to the first and the second command, as shown in FIG. 9A. "Ts" represents a sample timing. The suffixes (n), (n−1) represent a current computed value and a previously computed value, respectively.

3. Advantages that Control System Achieves (1) According to the present engine control system, the "ICOC" (the in-cylinder oxygen ratio "α") is computed during the transition period of the air-fuel ratio, and the target ignition timing "IGTIMETRG", the target injection pressure "PTRG", and the pilot injection quantity "QPLTRG" are computed based on the "ICOC" (the in-cylinder oxygen ratio "α"). Thus, the target ignition timing "IGTIMETRG", the target injection pressure "PTRG", and the pilot injection quantity "QPLTRG" can be made suitable for the "ICOC" (the in-cylinder oxygen ratio "α") at the time. As the result, the combustion noise during the transition period of the air-fuel ratio can be suitably controlled so that the passenger does not feel uncomfortable.

(2) During the transition period from the lean-combustion to the rich-combustion, the "ICOC" is computed based on the manifold intake air flow rate, the manifold EGR gas flow rate and the oxygen concentration of the EGR gas. Thus, the "ICOC" and the in-cylinder oxygen ratio "α" can be accurately computed. As the result, the combustion noise during the transition period of the air-fuel ratio can be suitably controlled so that the variation in the combustion noise can be decreased.

(3) During the transition period from the rich-combustion to the lean-combustion, the variation in the in-cylinder oxygen ratio "α" is estimated according to the first-order-lag formula by using of the time constant "T" which is established based on the engine speed and the accelerator position (step S40). Thus, the in-cylinder oxygen ratio "α" can be computed more quickly than the processes in steps S30 and S50. Thus, it is districted that the computed variation in the in-cylinder oxygen ratio "α" is delayed than the actual variation in the in-cylinder oxygen ratio "α".

Generally, during the transition period from the rich-combustion to the lean-combustion, the combustion noise is made loud. If the computed variation in the in-cylinder oxygen ratio "α" is delayed than the actual variation, the controls of the target ignition timing "IGTIMETRG", the target injection pressure "PTRG", and the target pilot injection quantity "QPLTRG" are also delayed, which causes a loud combustion noise. According to the present embodiment, since such a delay of variation is not generated, the loud combustion noise due to the control delay can be avoided.

The present invention should not be limited to the disclosed embodiment, but may be implemented in other ways without departing from the spirit of the invention.

For example, all of the parameters (the target ignition timing, the target injection pressure and the target pilot injection quantity) are not always set according to the in-cylinder oxygen ratio "α". One or two of three parameters may be set according to the in-cylinder oxygen ratio "α".

The manifold EGR gas flow rate can be computed based on a difference between the exhaust gas flow rate and the manifold intake air flow rate. The exhaust gas flow rate can be computed by means of an exhaust gas flow rate sensor disposed in the exhaust passage 7. Also, the exhaust gas flow rate can be computed based on the exhaust gas temperature and the exhaust gas pressure which are detected by a sensor disposed in the exhaust passage 7.

What is claimed is:

1. An engine control system comprising:
   a combustion-change means which outputs a command for changing a flow rate of gas flowing into a cylinder and an injection quantity of fuel injected into the cylinder in order to change an air-fuel ratio of an exhaust gas;
   a concentration computing means which computes an in-cylinder oxygen concentration;
   a memory means which stores first values and second values of parameters of a target ignition timing, a target injection pressure, and a target pilot injection quantity, the first values being set in a case that the in-cylinder oxygen concentration is a first oxygen concentration, the second values being set in a case that the in-cylinder oxygen concentration is a second oxygen concentration which is higher than the first oxygen concentration; and
   a parameter value setting means which sets the values of the parameters so as to correlate to the in-cylinder oxygen concentration of during a transition period of the air-fuel ratio, the values of the parameters being obtained by an interpolation based on the first and the second values of the parameters and the in-cylinder oxygen concentration, so that a combustion noise during a transition period of the air-fuel ratio is controlled so that a variation in combustion noise is decreased.

2. An engine control system according to claim 1, wherein the concentration computing means computes the in-cylinder oxygen concentration based on a manifold intake air flow rate, a manifold EGR gas flow rate, and an oxygen concentration of an EGR gas.

3. An engine control system according to claim 1, wherein the concentration computing means computes the in-cylinder oxygen concentration based on an engine speed, an accelerator position, and an elapsed time after the combustion-change means outputs the command.

4. An engine control system according to claim 1, wherein the concentration computing means computes the in-cylinder oxygen concentration based on a manifold intake air flow rate, a manifold EGR gas flow rate, and an oxygen concentration of an EGR gas in a case that the combustion-change means outputs the command to change the air-fuel ratio from lean to rich, and
the concentration computing means computes the in-cylinder oxygen concentration based on an engine speed, an accelerator position, and an elapsed time after the combustion-change means outputs the command in a case that the combustion-change means outputs the command to change the air-fuel ratio from rich to lean.

5. An engine control system according to claim 2, wherein the concentration computing means computes the manifold intake air flow rate by means of an airflow meter.

6. An engine control system according to claim 2, wherein the concentration computing means computes the manifold EGR gas flow rate based on a difference between the exhaust gas flow rate and the manifold intake air flow rate or a difference between an in-cylinder gas flow rate and the manifold intake air flow rate.

7. An engine control system according to claim 6, wherein the concentration computing means computes the exhaust gas flow rate by means of an exhaust gas flow sensor or based on an exhaust gas temperature and an exhaust gas pressure.

8. An engine control system according to claim 6, wherein the concentration computing means computes the in-cylinder gas flow rate based on a pressure and a temperature in a manifold.

9. An engine control system according to claim 1, wherein the engine control system is configure to control a diesel engine.

10. An engine control system comprising:
a processing system, comprising a computer processor, the processing system being configured to:
  determine whether a transition period of an air-fuel ratio exists where a lean-combustion is changed to a rich-combustion or a rich-combustion is changed to a lean-combustion;
  determine whether the transition period involves a transition from the lean combustion to the rich combustion upon a determination that the transition period of the air-fuel ratio exists;
  compute an in-cylinder oxygen concentration based on an intake air flow rate, an exhaust gas recirculation (EGR) gas flow rate, and an oxygen concentration in an EGR gas upon a determination that the transition period involves a transition from the lean combustion to the rich combustion;
  obtain an in-cylinder oxygen ratio based on the computed in-cylinder oxygen concentration;
  compute an in-cylinder oxygen ratio based on an engine speed, an accelerator position, and an elapsed time after a command is outputted to vary the air-fuel ratio upon a determination that the transition period involves a transition from the rich combustion to the lean combustion; and
  perform the following:
    obtain a target ignition timing for the transition period based at least on the obtained in-cylinder oxygen ratio or the computed in-cylinder oxygen ratio;
    obtain a target pilot injection quantity for the transition period based at least on the obtained in-cylinder oxygen ratio or the computed in-cylinder oxygen ratio;
    obtain a target injection pressure in the transition period based at least on the obtained in-cylinder oxygen ratio or the computed in-cylinder oxygen ratio; and
    compute a main injection quantity of fuel, so that a combustion noise during a transition period of the air-fuel ratio is controlled so that a variation in combustion noise is decreased.

11. A method of controlling an engine, the method comprising:
outputting a command for changing a flow rate of gas flowing into a cylinder and an injection quantity of fuel injected into the cylinder in order to change an air-fuel ratio of an exhaust gas;
computing, using a computer processor, an in-cylinder oxygen concentration;
storing, in a non-transitory computer-readable storage medium, first values and second values parameters of a target ignition timing, a target injection pressure, and a target pilot injection quantity, the first values being set in a case that the in-cylinder oxygen concentration is a first oxygen concentration, the second values being set in a case that the in-cylinder oxygen concentration is a second oxygen concentration which is higher than the first oxygen concentration; and
setting values of the parameters so as to correlate to the in-cylinder oxygen concentration of during a transition period of the air-fuel ratio, the values of the parameters being obtained by an interpolation based on the first and the second values of the parameters and the in-cylinder oxygen concentration, so that a combustion noise during a transition period of the air-fuel ratio is controlled so that a variation in combustion noise is decreased.

12. The method according to claim 11, wherein
the in-cylinder oxygen concentration is computed based on a manifold intake air flow rate, a manifold EGR gas flow rate, and an oxygen concentration of an EGR gas.

13. The method according to claim 11, wherein
the in-cylinder oxygen concentration is computed based on an engine speed, an accelerator position, and an elapsed time after the command is outputted.

14. The method according to claim 11, wherein
the in-cylinder oxygen concentration is computed based on a manifold intake air flow rate, a manifold EGR gas flow rate, and an oxygen concentration of an EGR gas in a case that the command to change the air-fuel ratio from lean to rich is outputted, and
the in-cylinder oxygen concentration is computed based on an engine speed, an accelerator position, and an elapsed time after the command is outputted in a case that the command to change the air-fuel ratio from rich to lean is outputted.

15. The method according to claim 12, wherein
the manifold intake air flow rate is computed using an airflow meter.

16. The method according to claim 12, wherein
the manifold EGR gas flow rate is computed based on a difference between the exhaust gas flow rate and the manifold intake air flow rate or a difference between an in-cylinder gas flow rate and the manifold intake air flow rate.

17. The method according to claim 16, wherein the exhaust gas flow rate is computed using an exhaust gas flow sensor or based on an exhaust gas temperature and an exhaust gas pressure.

18. The method according to claim 16, wherein the in-cylinder gas flow rate is computed based on a pressure and a temperature in a manifold.

19. The method according to claim 11, wherein the method of controlling an engine controls a diesel engine.

* * * * *